(12) United States Patent
Tomokage et al.

(10) Patent No.: US 11,121,603 B2
(45) Date of Patent: Sep. 14, 2021

(54) DRIVE UNIT

(71) Applicants: HONDA MOTOR CO., LTD., Tokyo (JP); Mitsubishi Electric Corporation, Tokyo (JP)

(72) Inventors: Ryoji Tomokage, Wako (JP); Masahiro Shimada, Wako (JP); Seiichi Goto, Wako (JP); Naoki Honishi, Tokyo (JP); Takashi Omura, Tokyo (JP)

(73) Assignees: HONDA MOTOR CO., LTD., Tokyo (JP); Mitsubishi Electric Corporation, Tokyo (JP)

( * ) Notice: Subject to any disclaimer, the term of this patent is extended or adjusted under 35 U.S.C. 154(b) by 592 days.

(21) Appl. No.: 16/030,921

(22) Filed: Jul. 10, 2018

(65) Prior Publication Data

US 2019/0020242 A1    Jan. 17, 2019

(30) Foreign Application Priority Data

Jul. 13, 2017   (JP) .............................. JP2017-137374

(51) Int. Cl.
| | |
|---|---|
| *H02K 5/24* | (2006.01) |
| *H02K 11/33* | (2016.01) |
| *H02K 5/04* | (2006.01) |
| *H02K 7/00* | (2006.01) |
| *H02K 9/22* | (2006.01) |
| *B60K 1/00* | (2006.01) |
| *H02P 27/06* | (2006.01) |

(52) U.S. Cl.
CPC ................. *H02K 5/24* (2013.01); *H02K 5/04* (2013.01); *H02K 7/006* (2013.01); *H02K 9/22* (2013.01); *H02K 11/33* (2016.01); *B60K 1/00* (2013.01); *H02K 2213/03* (2013.01); *H02K 2213/09* (2013.01); *H02P 27/06* (2013.01)

(58) Field of Classification Search
CPC ............ H02K 5/24; H02K 5/04; H02K 7/007; H02K 7/006; H02K 9/22; H02K 11/33; H02K 2213/03; H02K 2213/09; B60K 1/00; H02P 27/06
See application file for complete search history.

(56) References Cited

U.S. PATENT DOCUMENTS

| | | | |
|---|---|---|---|
| 2013/0082550 A1* | 4/2013 | Fleming | ................... H02K 9/22 310/63 |
| 2014/0339009 A1 | 11/2014 | Suzuki et al. | |
| 2016/0218602 A1 | 7/2016 | Fukushima et al. | |

FOREIGN PATENT DOCUMENTS

| | | |
|---|---|---|
| JP | 2016-140198 | 8/2016 |
| WO | 2013/080736 | 6/2013 |

* cited by examiner

*Primary Examiner* — Jue Zhang
(74) *Attorney, Agent, or Firm* — Amin, Turocy & Watson, LLP (57) ABSTRACT

A circuit unit of a drive unit includes a plate-shaped heat sink that extends in a direction perpendicular to an axis of rotation of a motor, and a lower case arranged on a lower side of the heat sink. In the drive unit, a fastening member, which is formed on the lower case, is fastened to a housing, and a height of a fastening surface, which is located on an upper end of the fastening member, is positioned within a height range that spans from a lower surface to an upper surface of the heat sink.

6 Claims, 7 Drawing Sheets

DRIVE UNIT

CROSS-REFERENCE TO RELATED APPLICATION

This application is based upon and claims the benefit of priority from Japanese Patent Application No. 2017-137374 filed on Jul. 13, 2017, the contents of which are incorporated herein by reference.

BACKGROUND OF THE INVENTION

Field of the Invention

The present invention relates to a drive unit which is provided in an electric vehicle or a hybrid vehicle and is a combination of a motor and a circuit unit.

Description of the Related Art

An electric vehicle or a hybrid vehicle that uses an electric motor as a drive source includes a drive circuit which converts electric power supplied from a high voltage power supply into electric power for driving the motor and supplies the electric power to the motor. This drive circuit is accommodated in a case and is itself formed as a unit, which is referred to as a circuit unit, for example. Apart from the components of the drive circuit, the circuit unit is equipped with a heat sink adapted to cool the drive circuit, and an ECU that controls the motor by controlling a switching operation of the drive circuit, and the like. The motor and the circuit unit constitute a drive unit.

Japanese Laid-Open Patent Publication No. 2016-140198 shows a drive unit having a generator in addition to a motor and a circuit unit. As described in Japanese Laid-Open Patent Publication No. 2016-140198, a casing of the circuit unit is fastened by bolts to an upper side of a housing in which the motor and the generator are accommodated. In the case of a hybrid vehicle, the housing of the motor and the generator is attached to a housing that houses a power generating device (hereinafter referred to as a power plant) including an engine and a transmission, etc. Further, the rotary shafts of the motor and the generator are connected to the rotary shaft of the engine.

SUMMARY OF THE INVENTION

Vibrations from the engine propagate to the drive unit. Further, the motor and the generator themselves that constitute the drive unit also vibrate during the time that rotational operations take place. Such vibrations cause the entire drive unit to vibrate. At this time, if the circuit unit, which is fixed to an upper portion of the drive unit, vibrates and shakes significantly, there is a concern that the vibrations of the drive unit itself may be amplified and noise will increase. In addition, there is a concern that the engine and the drive unit may resonate, and the rigidity of the drive unit and the power plant with respect to such vibrations may be insufficient.

The present invention has been devised taking into consideration the aforementioned problems, and has the object of providing a drive unit in which vibrations can be suppressed.

A first aspect of the present invention is characterized by a drive unit having a motor, and a circuit unit accommodating a drive circuit configured to supply to the motor electrical power input from a power source, the circuit unit being fixed to an upper side of a housing of the motor;

the circuit unit including:
a plate-shaped heat sink that extends in a direction perpendicular to an axis of rotation of the motor; and
a lower case arranged on a lower side of the heat sink;
wherein a fastening member, which is formed on the lower case, is fastened to the housing; and
a height of a fastening surface, which is located on an upper end of the fastening member, is positioned within a height range that spans from a lower surface to an upper surface of the heat sink.

The circuit unit is provided in which the constituent components of the drive circuit are provided above and below the plate-shaped heat sink which extends in a direction perpendicular to the axis of rotation of the motor. The position of the center of gravity of the circuit unit having such a shape is located in close proximity to the height of the heat sink. In the event that the lower case, which is arranged on the lower side of the heat sink, and the housing of the motor are fastened to each other, then when a distance in the height direction between the heat sink and the fastening surface positioned on the upper end of the fastening member increases, the deviation accordingly becomes increased between the height of the fastening surface and the height of the center of gravity of the circuit unit. In such a case, vibratory shaking of the circuit unit tends to become large when the drive unit vibrates.

According to the first aspect of the invention, since the fastening surface of the lower case, which is fastened with respect to the housing, is positioned within the height range that spans from the lower surface to the upper surface of the heat sink, compared to the case in which the height of the fastening surface lies within a height range above or below the heat sink, the deviation in the height direction between the center of gravity of the circuit unit and the fastening surface is kept small, and hence vibratory shaking of the circuit unit can be suppressed. Therefore, even if the drive unit undergoes vibration due to vibration of the engine or vibration of the motor, amplification of the vibration of the drive unit due to vibratory shaking of the circuit unit can be suppressed. Accordingly, vibration of the drive unit can be suppressed.

In the first aspect of the invention, the height of a center of gravity of the circuit unit may be positioned within the height range that spans from the lower surface to the upper surface of the heat sink.

In accordance with the above-described configuration, since the height of the center of gravity of the circuit unit is located within the height range of the heat sink having maximal rigidity, the vibrations of the drive unit can be prevented from being amplified.

In the first aspect of the invention, the fastening surface may be positioned at a height of the lower surface of the heat sink.

In accordance with the above-described configuration, since the fastening surface is formed at the height of a mating surface with respect to the heat sink of the lower case, the vibrations of the drive unit can be prevented from being amplified, while complication in structure of the lower case is suppressed.

In the first aspect of the present invention, a bolt hole may be formed in an outer surface of the housing, and in a state in which a threaded portion of a bolt is fitted into the bolt hole, a head of the bolt may press the upper end of the fastening member against a side of the housing, whereby the fastening member and the housing are fastened to each other, and the fastening surface may be a plane including the upper end of the fastening member.

In accordance with the above-described configuration, because the fastening member is pressed downward by the bolt, the fastening portion and the housing can be fastened together more firmly.

A second aspect of the present invention is characterized by a drive unit having a motor, and a circuit unit accommodating a drive circuit configured to supply to the motor electrical power input from a power source, the circuit unit being fixed to an upper side of a housing of the motor;

the circuit unit including:

a plate-shaped heat sink on which components of the drive circuit are fixed on an upper surface and a lower surface thereof; and a lower case arranged on a lower side of the heat sink;

wherein a fastening member, which is formed on the lower case, is fastened to the housing; and a height of a fastening surface, which is located on an upper end of the fastening member, is positioned within a height range that spans from the lower surface to the upper surface of the heat sink.

According to the second aspect of the invention, since the fastening surface of the lower case, which is fastened with respect to the housing, is positioned within the height range that spans from the lower surface to the upper surface of the heat sink, compared to the case in which the height of the fastening surface lies within a height range above or below the heat sink, the deviation in the height direction between the center of gravity of the circuit unit and the fastening surface is kept small, and hence vibratory shaking of the circuit unit can be suppressed. Therefore, even if the drive unit undergoes vibration due to vibration of the engine or vibration of the motor, amplification of the vibration of the drive unit due to vibratory shaking of the circuit unit can be suppressed. Accordingly, vibration of the drive unit can be suppressed.

In the second aspect of the present invention, a bolt hole may be formed in an outer surface of the housing, and in a state in which a threaded portion of a bolt is fitted into the bolt hole, a head of the bolt may press the upper end of the fastening member against a side of the housing, whereby the fastening member and the housing are fastened to each other, and the fastening surface may be a plane including the upper end of the fastening member.

In accordance with the above-described configuration, because the fastening member is pressed downward by the bolt, the fastening portion and the housing can be fastened together more firmly.

According to the present invention, even if the drive unit undergoes vibration due to vibration of the engine or vibration of the motor, amplification of the vibration of the drive unit due to vibratory shaking of the circuit unit can be suppressed. Accordingly, vibration of the drive unit can be suppressed.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a drive unit according to the present invention will be described in detail below with reference to the accompanying drawings. Moreover, in the description of the embodiment presented below, it is assumed that the drive unit is provided in a hybrid vehicle having an engine and a motor as drive sources.

[1. Drive Unit 14]

Figure 1:
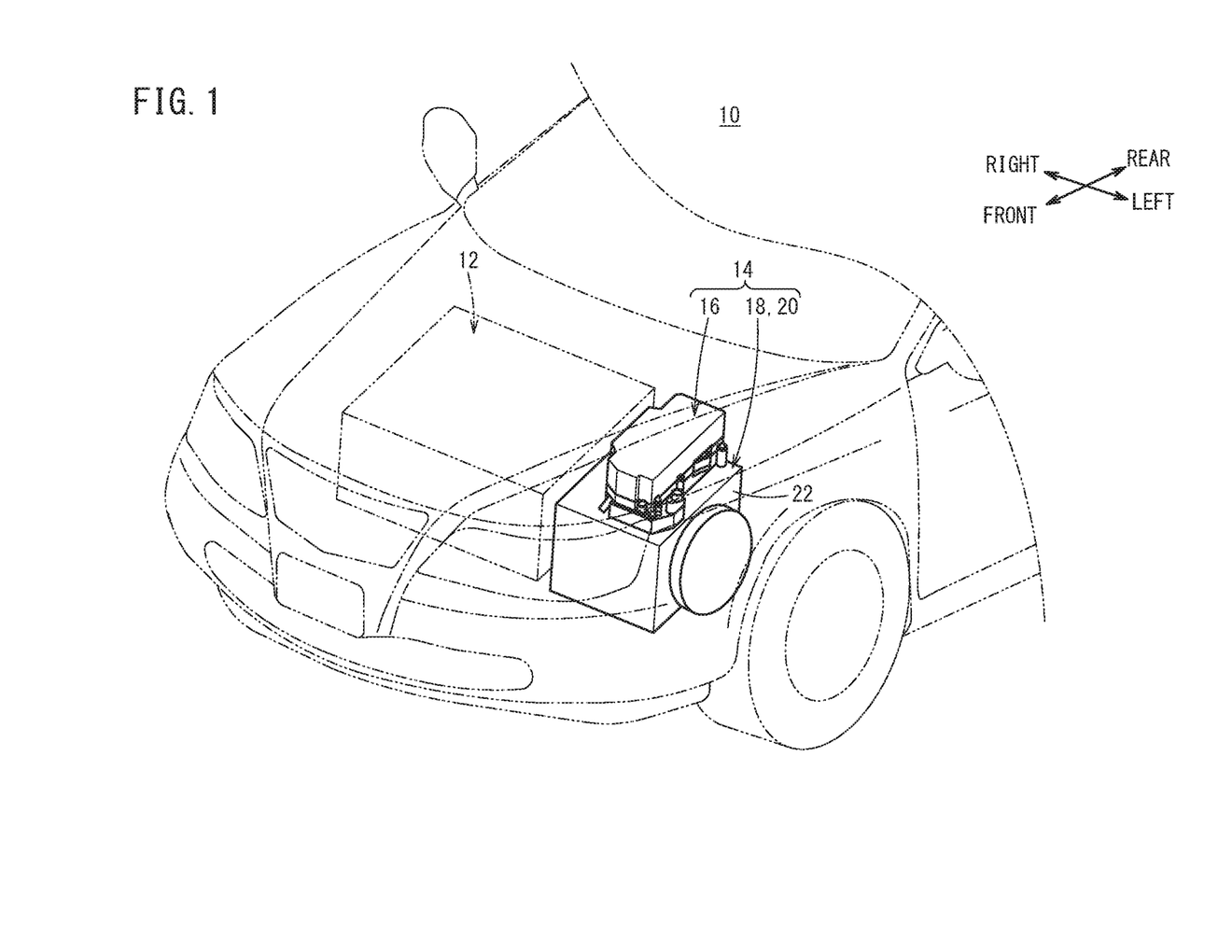
FIG. 1 is a simplified external view of a drive unit provided in a vehicle.

As shown in FIG. 1, a drive unit 14 according to the present embodiment is disposed at a front portion of a vehicle 10 and on the left side of a power plant 12. The drive unit 14 comprises a traction motor 18 and a generator 20 at a lower portion thereof, and a circuit unit 16 at an upper portion thereof. The upper and lower directions in the present specification represent a relative positional relationship between the motor 18 and the generator 20 and the circuit unit 16. In the present specification, the positions of the motor 18 and the generator 20 are defined as being on a lower side, whereas the position of the circuit unit 16 is defined as being on an upper side. Also, the upper and lower directions may also be referred to as a height direction. The rotary shaft of the motor 18 and the rotary shaft of the generator 20 are connected to the rotary shaft of the engine included within the power plant 12. The motor 18 and the generator 20 share a common housing 22. The motor 18 is arranged so that an axis of rotation C thereof (see FIGS. 5A, 6A, 7A) is arranged in parallel with the vehicle width direction.

The motor 18 is a three-phase alternating current (AC) brushless type motor and serves as a drive source for driving the vehicle 10, and which generates motive power and supplies the motive power to the driving wheels. More specifically, the motor 18 is driven by one or both of the power from a high voltage battery 24 (see FIG. 2) and the power from the generator 20. Further, the motor 18 carries out regeneration during braking of the vehicle 10, and supplies regenerative electric power to the high voltage battery 24. The regenerative electric power may also be supplied to a low voltage system 94 (see FIG. 2). The motor 18 may function as a generator in addition to or instead of providing a traveling drive function.

Figure 2:
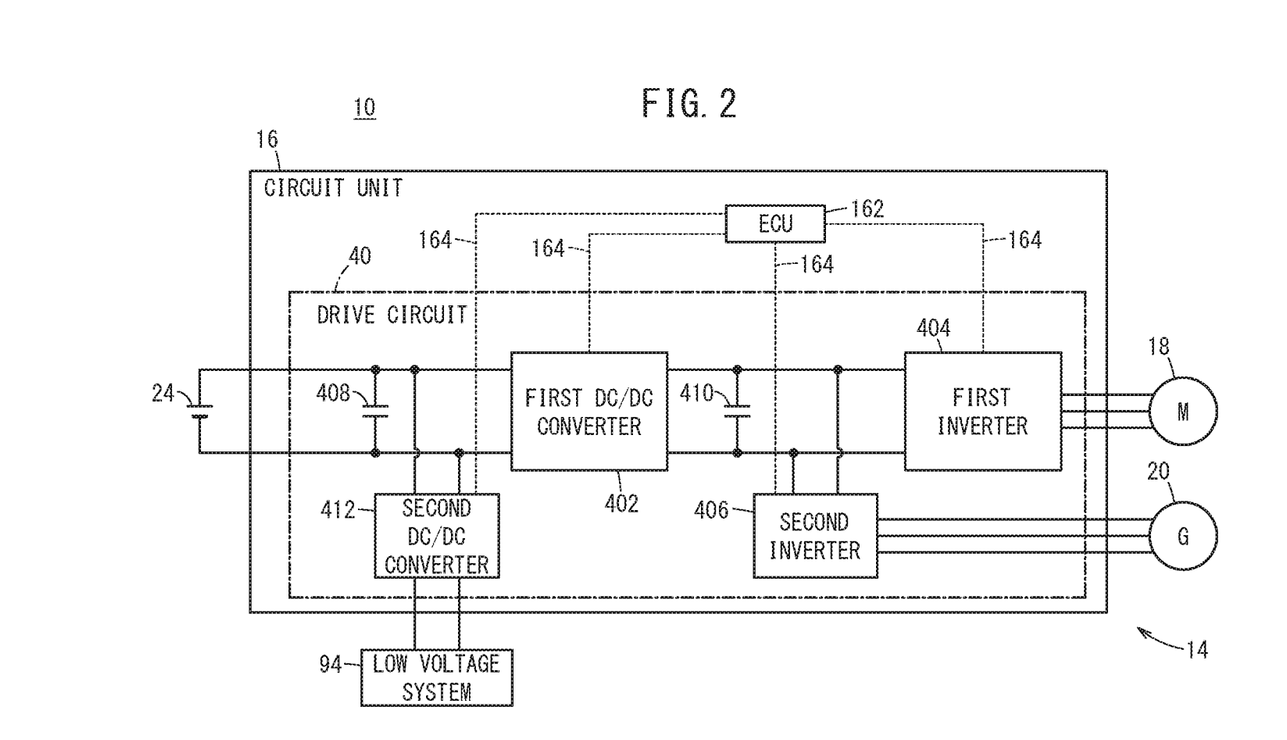
FIG. 2 is a circuit diagram of a circuit unit possessed by the drive unit.

The generator 20 is a three-phase alternating current brushless type generator, and generates power by the power from the engine. The electric power generated by the generator 20 is supplied to the high voltage battery 24 or the motor 18, or is supplied to the low voltage system 94. The generator 20, in addition to or instead of the electric power generating function thereof, may also function as a traction motor.

The high voltage battery 24 is a power storage device (energy storage) including a plurality of battery cells, and is capable of outputting high voltage (several hundreds of volts). For example, a lithium ion secondary battery, a nickel hydrogen secondary battery, or the like, can be used for the high voltage battery 24. Instead of or in addition to the high voltage battery 24, it is also possible to use a power storage device such as a capacitor.

[2. Circuit Unit 16]

[2.1. Electrical Connection Configuration of Circuit Unit 16]

The circuit unit 16 is also referred to as a power control unit (PCU). A drive circuit 40 (see FIG. 2) included within the circuit unit 16 converts or adjusts the electric power from the high voltage battery 24 and/or the generator 20, and supplies the converted or adjusted electric power to the motor 18. Further, the drive circuit 40 converts or adjusts the generated electric power of the generator 20 and the regenerative electric power of the motor 18, and uses the converted or adjusted electric power to charge the high voltage battery 24.

As shown in FIG. 2, the circuit unit 16 includes the drive circuit 40, and an electronic control device 162 (hereinafter referred to as an "ECU 162"). The drive circuit 40 includes a first DC/DC converter 402, a first inverter 404, a second inverter 406, a first capacitor 408, a second capacitor 410, and a second DC/DC converter 412.

The first DC/DC converter 402 is a step-up/step-down (buck-boost) type converter. The first DC/DC converter 402 steps up (boosts) the output voltage of the high voltage battery 24, and outputs the stepped-up voltage to the motor 18. Further, the first DC/DC converter 402 steps down the output voltage of the generator 20 or the output voltage of the motor 18, and supplies the stepped-down voltage to the high voltage battery 24.

The first inverter 404 converts the direct current (DC current) from the high voltage battery 24 into an AC current, and supplies the AC current to the motor 18. Further, the first inverter 404 converts the AC current from the motor 18 into a DC current, and supplies the DC current to the high voltage battery 24.

The second inverter 406 converts the AC current from the generator 20 into a DC current, and supplies the DC current to the high voltage battery 24 and/or the motor 18. Further, in the case that the generator 20 is used as a traveling drive source, the second inverter 406 converts the DC current from the high voltage battery 24 into an AC current, and supplies the AC current to the generator 20.

The first capacitor 408 and the second capacitor 410 function as smoothing capacitors.

The second DC/DC converter 412 steps down the voltage of the high voltage battery 24, and outputs the stepped-down voltage to the low voltage system 94.

The ECU 162 is a control circuit (or a control device) that controls the respective components of the drive circuit 40, and has an input/output unit, a computation unit, and a storage unit, none of which are shown. The input/output unit inputs signals to and outputs signals from the respective components of the vehicle 10 via signal lines 164 (communication lines). It should be noted that, in FIG. 2, the signal lines 164 are shown in a simplified manner. The input/output unit includes a non-illustrated A/D conversion circuit for converting input analog signals into digital signals.

The computation unit includes a central processing unit (CPU), and operates by executing programs stored in the storage unit. A portion of the functions executed by the computation unit can also be realized through the use of logic ICs. The programs may be supplied from the exterior via a non-illustrated wireless communications device (a mobile phone, a smartphone, or the like). In the computation unit, a portion of such programs can also be constituted by hardware (circuit components).

The storage unit stores programs and data used by the computation unit, and is equipped with a random access memory (RAM). As the RAM, there can be used a volatile memory such as a register or the like, and a nonvolatile memory such as a flash memory or the like. Further, in addition to the RAM, the storage unit may include a read only memory (ROM).

The low voltage system 94 is a power system that handles low voltage (for example, 12 V). The low voltage system 94 includes, for example, a low voltage battery, a navigation device, a headlight (none of which are shown), an ECU, and the like.

[2.2. Structure of Circuit Unit 16]

Figure 3:
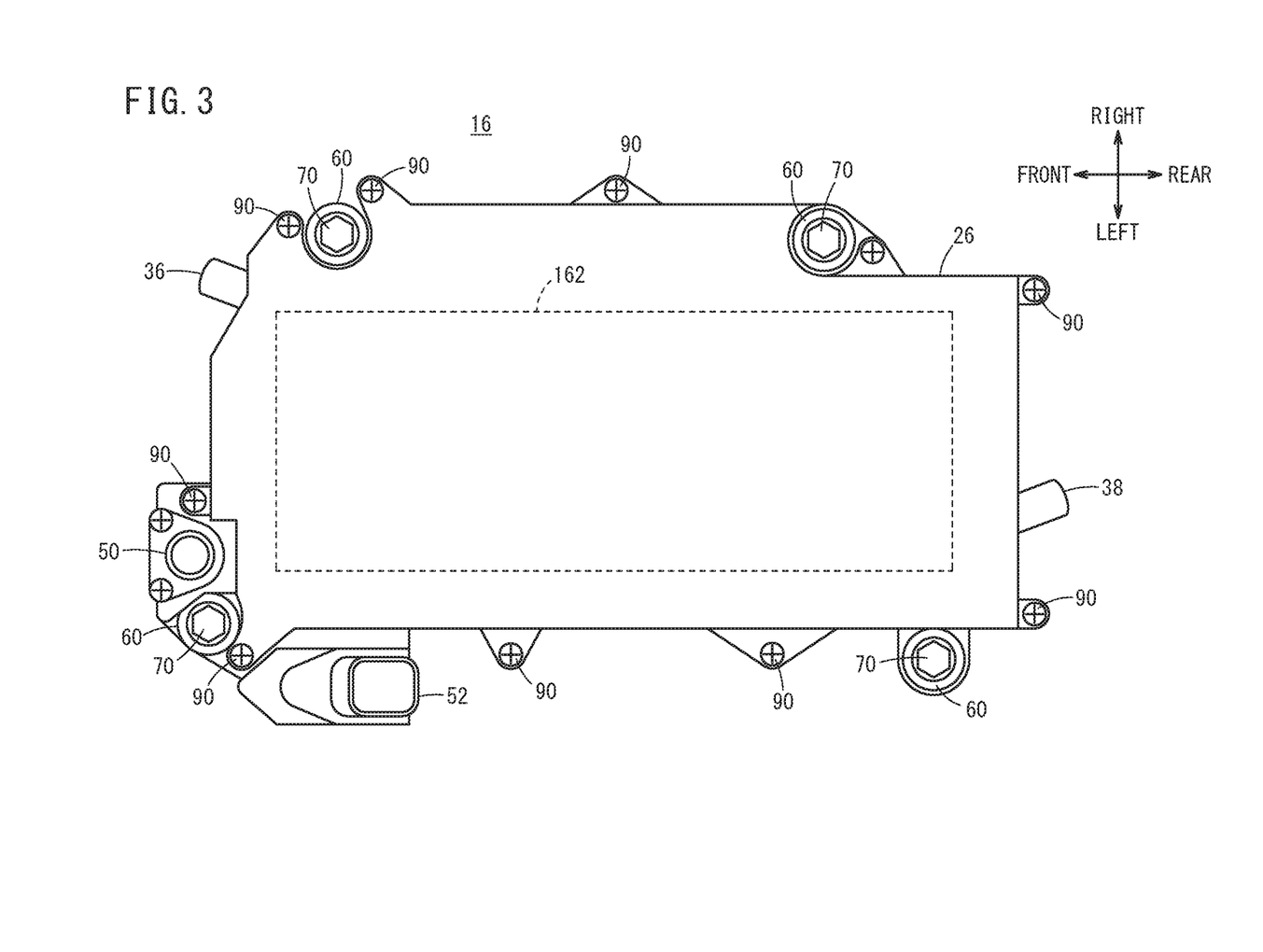
FIG. 3 is a simplified plan view of the circuit unit possessed by the drive unit.
Figure 4:
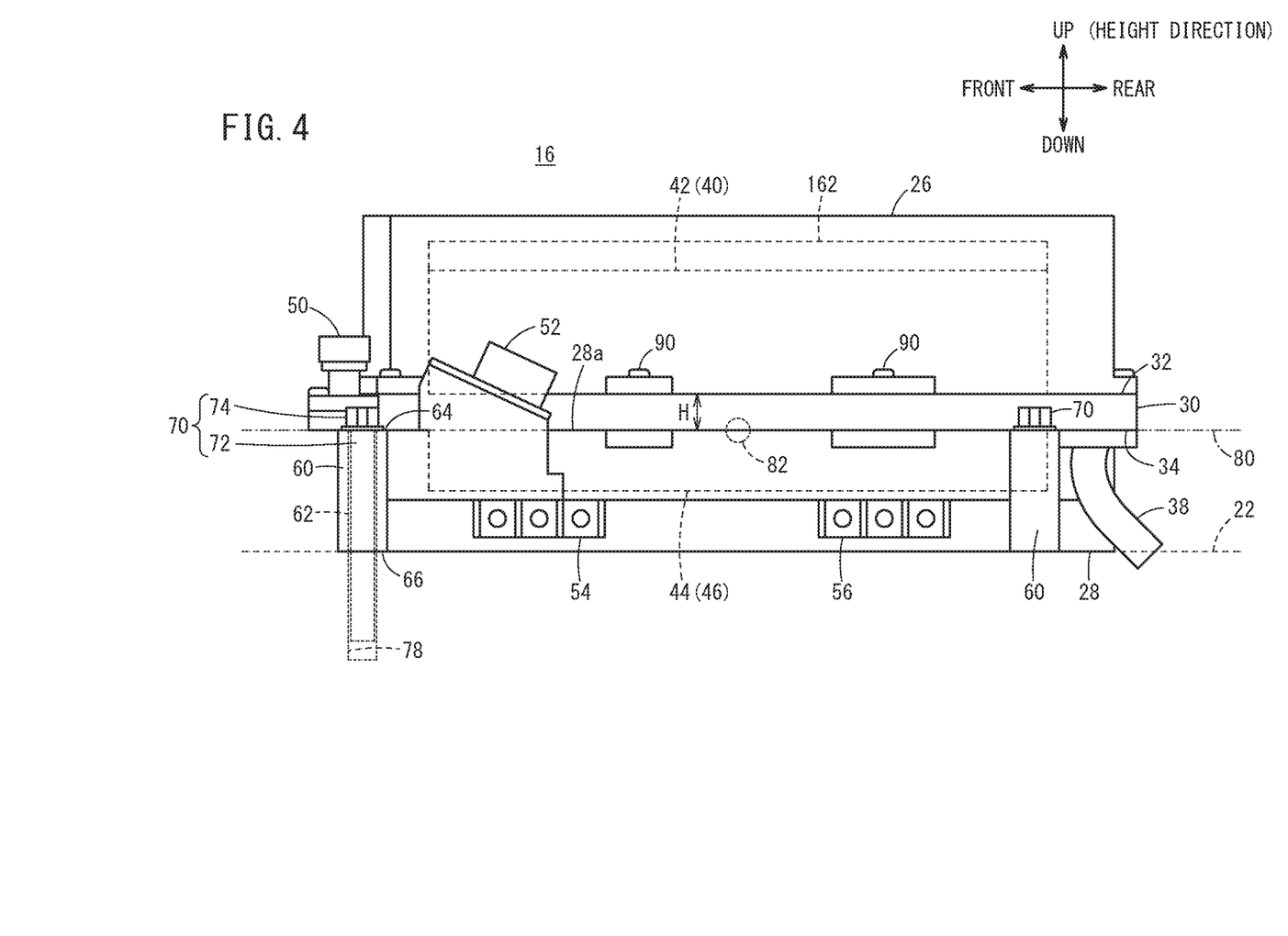
FIG. 4 is a simplified side view of the circuit unit possessed by the drive unit.

As shown in FIGS. 3 and 4, in addition to the drive circuit 40 shown in FIG. 2, the circuit unit 16 includes an upper case 26, a lower case 28, a plate-shaped heat sink 30 that extends in a direction perpendicular to the axis of rotation C of the motor 18, and the ECU 162. With the circuit unit 16 of the present embodiment, the upper case 26 is disposed on an upper side (one side in the height direction), and the lower case 28 is disposed on a lower side (the other side in the height direction) with the heat sink 30 acting as a boundary therebetween. Moreover, in FIGS. 3 and 4, the drive circuit 40 (a first constituent component 42, a second constituent component 44) and the ECU 162, which are accommodated in the circuit unit 16, are indicated by dashed lines.

The heat sink 30 is formed of a metal such as aluminum that exhibits high thermal conductivity, and cools the drive circuit 40. The heat sink 30 possesses a certain thickness in the height direction, and includes cooling fins and a coolant flow path (water jacket) formed between the upper surface 32 and the lower surface 34 as shown in, for example, International Publication No. WO 2013/080736. An inflow pipe 36 which allows the coolant to flow into an internal flow path, and an outflow pipe 38 which allows the coolant to flow out from the internal flow path are connected to the heat sink 30. The heat sink 30 forms a cooling circuit through which the coolant is circulated, together with a tank, a pump, a radiator, etc., none of which are shown. The first constituent component 42 to be cooled is fixed to the upper surface 32 of the heat sink 30, and the second constituent component 44 to be cooled is fixed to the lower surface 34.

The first constituent component 42 and the second constituent component 44 that constitute the drive circuit 40 are made up from a group of components, which form the first DC/DC converter 402, the first inverter 404, the second inverter 406, the first capacitor 408, the second capacitor 410, the second DC/DC converter 412, and the like shown in FIG. 2. As an example, the first constituent component 42 includes the components of the first inverter 404, the second inverter 406, the first capacitor 408, and the second capacitor 410, and the second constituent component 44 includes the components of the first DC/DC converter 402 and the second DC/DC converter 412. However, the arrangement of the respective constituent components is not limited to the aforementioned example.

A first terminal 50 is provided at a front portion of the heat sink 30. The first terminal 50 is an output terminal of the drive circuit 40, and is connected via a harness to the low voltage system 94.

The upper surface 32 of the heat sink 30, the first constituent component 42, and the ECU 162 are covered by the upper case 26. The lower surface 34 of the heat sink 30 and the second constituent component 44 are covered by the lower case 28. The upper case 26, the heat sink 30, and the lower case 28 are fastened to each other by a plurality of screw members 90. The length of the upper case 26 in the height direction is longer than the length of the lower case 28 in the height direction. In addition, the heat sink 30 is disposed below a middle position in the height direction of the entire circuit unit 16.

A second terminal 52 is provided on a left portion of an outer edge of the lower case 28. The second terminal 52 is an input terminal of the drive circuit 40, and is connected via a harness to the high voltage battery 24. A third terminal 54 and a fourth terminal 56 are provided on a lower portion of the lower case 28. The third terminal 54 is an output terminal of the drive circuit 40, and is connected via a harness to input terminals of the respective phases of the motor 18. The fourth terminal 56 is an input terminal of the drive circuit 40, and is connected via a harness to output terminals of the respective phases of the generator 20.

A plurality of fastening members 60 are formed on the peripheral edge of the lower case 28. In the present embodiment, four fastening members 60 are provided. In the respective fastening members 60, through holes 62 are formed that penetrate from an upper side, i.e., one side in the height direction, to a lower side, i.e., the other side in the height direction. Threaded portions 72 of bolts 70 are inserted into the through holes 62 from above the fastening members 60. Ends of the threaded portions 72 protrude downward from lower ends 66 of the fastening members 60, and are fitted into bolt holes 78 which are formed in an upper portion of the housing 22 for the motor 18 and the generator 20. The threaded portions 72 are male threads, and the bolt holes 78 are female threads.

When the bolts 70 are rotated and tightened into the respective fastening members 60, the heads 74 of the bolts 70 press the upper ends 64 of the fastening members 60 against the side of the housing 22. Upon doing so, the lower ends 66 of the fastening members 60 are pressed against the housing 22, and the fastening members 60 and the housing 22 are fastened together. As a result, the lower case 28 and the housing 22 are fastened together, and the circuit unit 16 and the housing 22 are fastened together. In this state, a plane that includes the upper ends 64 of the plurality of fastening members 60 defines a fastening surface 80. The fastening members 60 are firmly fixed with respect to the housing 22, and an upper end of a fixing range thereof is coincident with the fastening surface 80.

A contact portion 28a where the lower case 28 abuts against the heat sink 30, and the upper ends 64 of the fastening members 60 lie flush with each other. Therefore, the height of the fastening surface 80 is the same as the height of the lower surface 34 of the heat sink 30. However, the upper ends 64 of the fastening members 60 may be higher in position than the contact portion 28a. In this case, the respective fastening members 60 are formed such that the height of the fastening surface 80 is located within a height range H that spans from the lower surface 34 to the upper surface 32 of the heat sink 30.

[3. Position of Center of Gravity of Circuit Unit 16]

In the circuit unit 16, the mass of the heat sink 30, which is the member having the highest rigidity from among the members that make up the circuit unit 16, is large, and the height of the center of gravity 82, which is the center of mass of the circuit unit 16, is disposed in close proximity to the heat sink 30.

In particular, in the present embodiment, from a relationship between the mass of the heat sink 30, the mass of the first constituent component 42 fixed to the upper side of the heat sink 30, and the mass of the second constituent component 44 fixed to the lower side of the heat sink 30, the height of the center of gravity 82 of the circuit unit 16 is positioned inside the heat sink 30, or stated otherwise, within the height range H of the heat sink 30.

A description will next be presented herein concerning the relationship between the height position of the center of gravity 82 of the circuit unit 16 and vibrations of the drive unit 14. When the power plant 12 and/or the motor 18 and the generator 20 are rotationally driven, the drive unit 14 vibrates in a manner so as to be inclined in front and rear directions, as indicated by the arrows A in FIGS. 5A, 6A, and 7A. Within the main body of the circuit unit 16, the fastening surface 80 is fixed most firmly with respect to the housing 22. Therefore, the fastening surface 80 can be regarded as a rigid body which is substantially integrated with the housing 22. Therefore, in the case that the drive unit 14 vibrates as indicated by the arrows A, the center of gravity 82 of the circuit unit 16 further undergoes vibration relative to the fastening surface 80 of the housing 22 and the circuit unit 16.

Figure 5A:
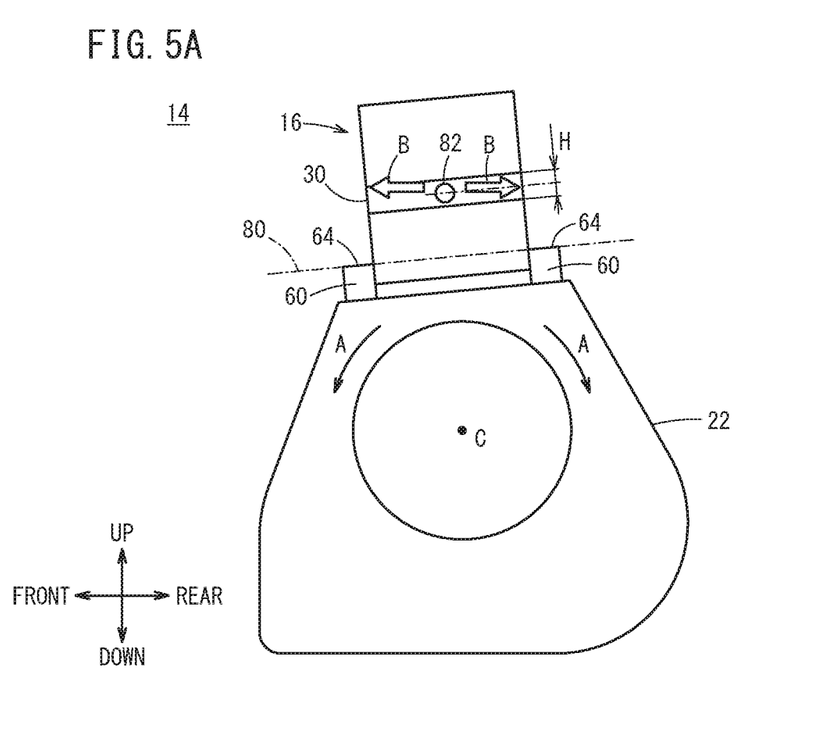
FIG. 5A is a diagram providing an explanation of vibrations of a drive unit in which a fastening surface is positioned higher than a heat sink thereof.
Figure 5B:
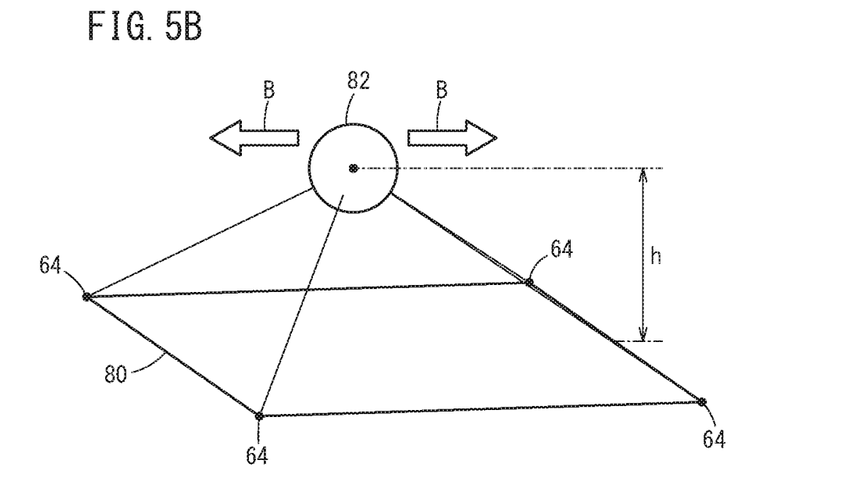
FIG. 5B is a diagram providing an explanation of a positional relationship between the fastening surface and the center of gravity of the circuit unit in FIG. 5A.

As shown in FIG. 5A, in the case that the fastening surface 80 is positioned lower than the height range H of the heat sink 30, the position of the center of gravity 82 of the circuit unit 16 becomes higher than the fastening surface 80. As shown in FIG. 5B, in the event that the distance h of the center of gravity 82 with respect to the fastening surface 80 is large in an upward direction, accompanying vibration (refer to the arrows A) of the housing 22, a large moment acts in the front and rear directions at the height position of the center of gravity 82. As a result, the vibration in the front and rear directions (refer to the arrows B) at the height position of the center of gravity 82 increases. When the vibration (arrows B) is large, the vibration (arrows A) of the entire drive unit 14 becomes even greater.

Figure 6A:
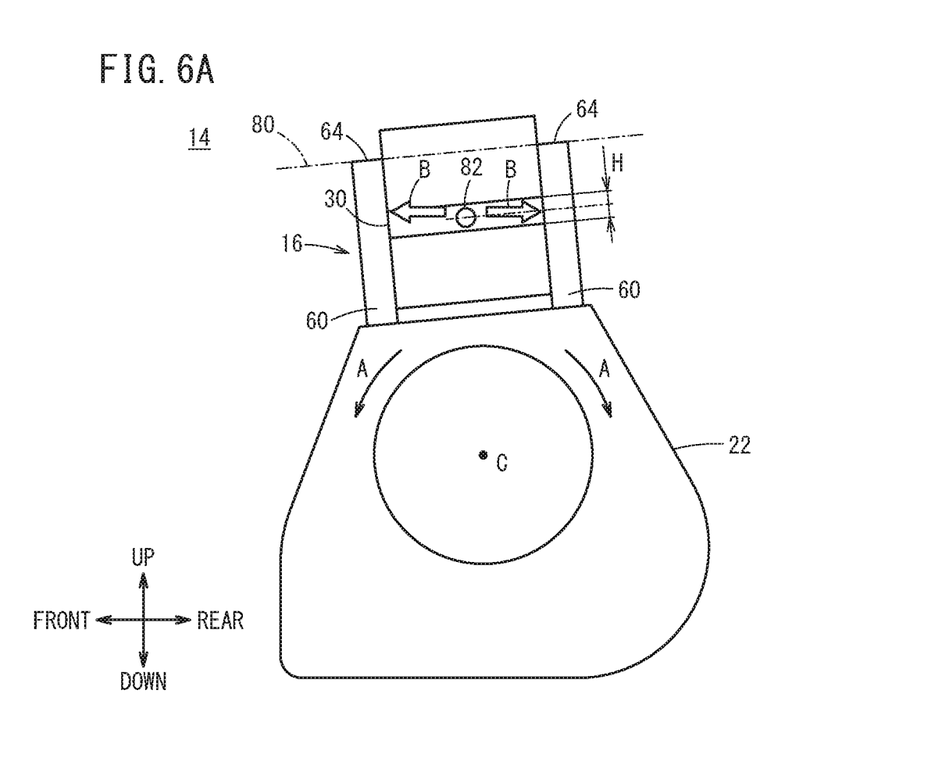
FIG. 6A is a diagram providing an explanation of vibrations of a drive unit in which the fastening surface is positioned lower than the heat sink thereof.
Figure 6B:
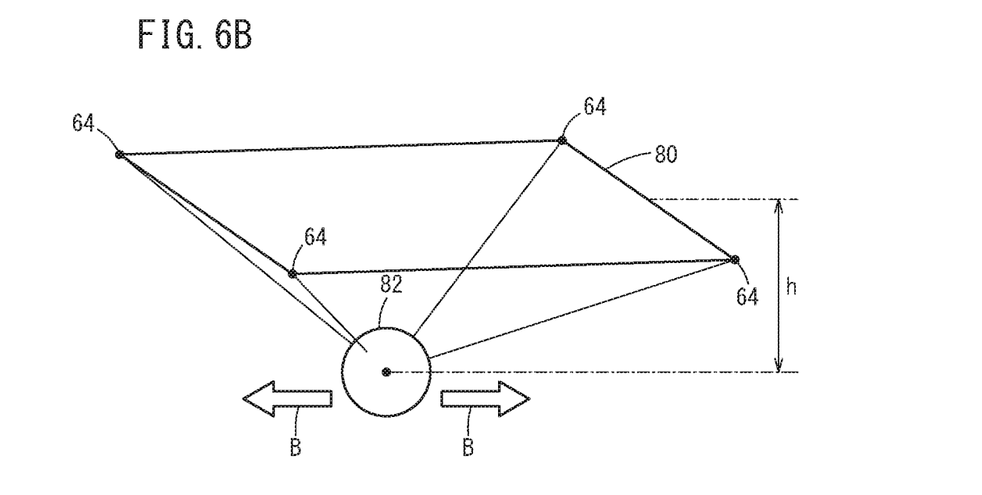
FIG. 6B is a diagram providing an explanation of a positional relationship between the fastening surface and the center of gravity of the circuit unit in FIG. 6A.

As shown in FIG. 6A, in the case that the fastening surface 80 is positioned higher than the height range H of the heat sink 30, the position of the center of gravity 82 of the circuit unit 16 becomes lower than the fastening surface 80. As shown in FIG. 6B, in the event that the distance h of the center of gravity 82 with respect to the fastening surface 80 is large in a downward direction, accompanying vibration (refer to the arrows A) of the housing 22, a large moment acts in the front and rear directions at the height position of the center of gravity 82. As a result, the vibration in the front and rear directions (refer to the arrows B) at the height position of the center of gravity 82 increases. When the vibration (arrows B) is large, the vibration (arrows A) of the entire drive unit 14 becomes even greater.

Figure 7A:
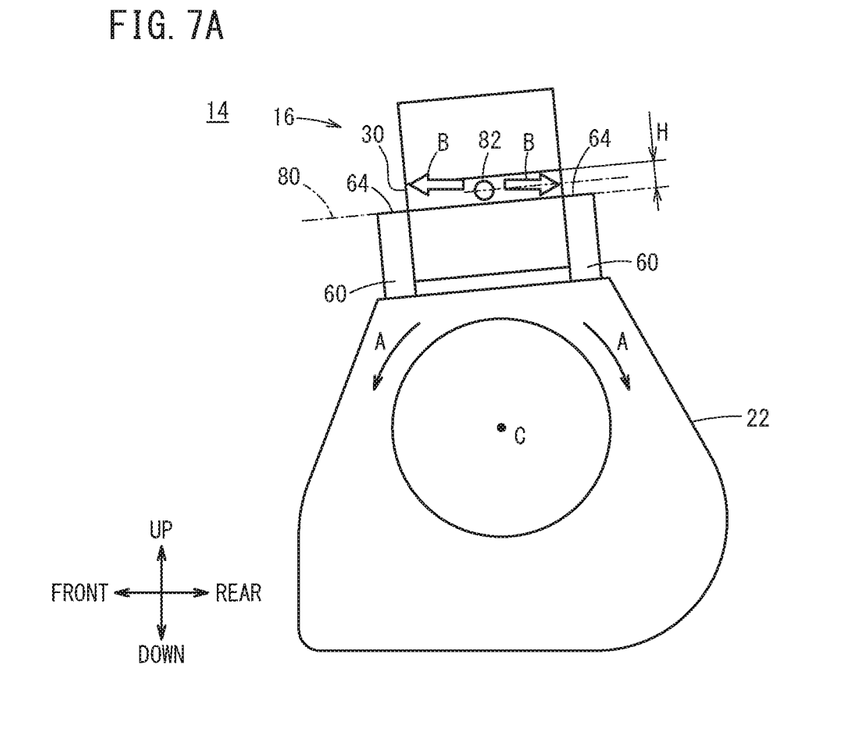
FIG. 7A is a diagram providing an explanation of vibrations of a drive unit in which the fastening surface is at the same position as the heat sink thereof.
Figure 7B:
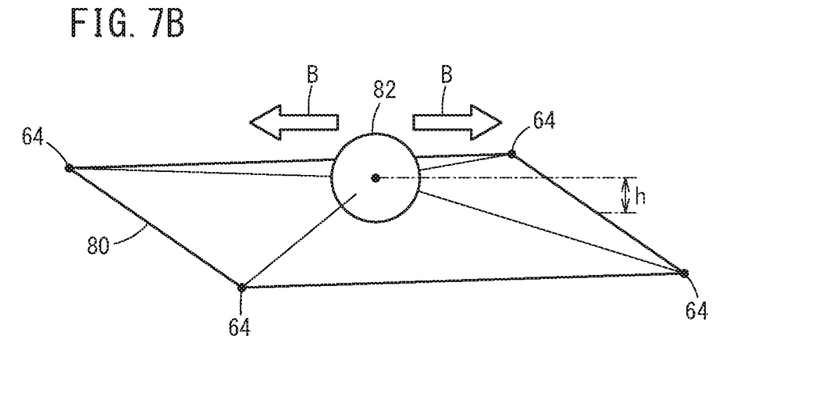
FIG. 7B is a diagram providing an explanation of a positional relationship between the fastening surface and the center of gravity of the circuit unit in FIG. 7A.

As shown in FIG. 7A, in the case that the fastening surface 80 is positioned within the height range H of the heat sink 30, the position of the center of gravity 82 of the circuit unit 16 becomes substantially the same height as the fastening surface 80. As shown in FIG. 7B, in the event that the distance h of the center of gravity 82 with respect to the fastening surface 80 is small, accompanying vibration (refer to the arrows A) of the housing 22, a comparatively small moment acts in the front and rear directions at the height position of the center of gravity 82. As a result, the vibration in the front and rear directions (refer to the arrows B) at the height position of the center of gravity 82 is suppressed and remains relatively small. Accordingly, when the vibration (arrows B) is small, the vibration (arrows A) of the entire drive unit 14 is prevented from becoming larger. Stated otherwise, it is possible to prevent the vibration (arrows A) of the entire drive unit 14 from becoming larger.

In this manner, the vibration of the drive unit 14 (refer to the arrows A) for which the distance h thereof is large tends to be large, whereas, in contrast thereto, the vibration of the drive unit 14 for which the distance h is small is suppressed so as to remain relatively small. As a result, in the case that the distance h is large, the rigidity of the drive unit 14 including the circuit unit 16 and the housing 22, which are fastened and fixed to each other, becomes low, whereas in the case that the distance h is small, the rigidity of the drive unit 14 including the circuit unit 16 and the housing 22 becomes high.

[4. Summary of the Present Embodiment]

The drive unit 14 includes the motor 18 and the circuit unit 16 that accommodates the drive circuit 40 for supplying electric power input from the high voltage battery 24 (power supply) to the motor 18, the circuit unit 16 being fixed to the upper side of the housing 22 of the motor 18. The circuit unit 16 comprises the plate-shaped heat sink 30 that extends in a direction perpendicular to the axis of rotation C of the motor 18, and the lower case 28 arranged on the lower side of the heat sink 30. In the drive unit 14, the fastening members 60, which are formed on the lower case 28, are fastened to the housing 22, and the height of the fastening surface 80, which is located on the upper ends 64 of the fastening members 60, is positioned within the height range H that spans from the lower surface 34 to the upper surface 32 of the heat sink 30. Moreover, the first constituent component 42 and the second constituent component 44 (constituent components) of the drive circuit 40 are fixed to the upper surface 32 and the lower surface 34 of the heat sink 30.

The circuit unit 16 is provided in which the first constituent component 42 and the second constituent component 44 of the drive circuit 40 are provided above and below the plate-shaped heat sink 30 extending in the longitudinal (front-rear) direction of the vehicle 10. The position of the center of gravity 82 of the circuit unit 16 having such a shape is located in close proximity to the height of the heat sink 30. In the event that the lower case 28, which is arranged on the lower side of the heat sink 30, and the housing 22 of the motor 18 are fastened to each other, then when the distance h in the height direction between the heat sink 30 and the fastening surface 80 positioned on the upper ends 64 of the fastening members 60 increases, the deviation accordingly becomes increased between the height of the fastening surface 80 and the height of the center of gravity 82 of the circuit unit 16. In such a case, vibratory shaking of the circuit unit 16 tends to become large when the drive unit 14 vibrates.

According to the present embodiment, since the fastening surface 80 of the lower case 28, which is fastened with respect to the housing 22, is positioned within the height range H that spans from the lower surface 34 to the upper surface 32 of the heat sink 30 where the center of gravity 82 is located, compared to a case in which the height of the fastening surface 80 lies within a height range above or below the heat sink 30, the deviation in the height direction between the center of gravity 82 of the circuit unit 16 and the fastening surface 80 is kept small, and hence vibratory shaking of the circuit unit 16 can be suppressed. Therefore, even if the drive unit 14 undergoes vibration due to vibration of the engine or vibration of the motor 18, amplification of the vibration of the drive unit 14 due to vibratory shaking of the circuit unit 16 can be suppressed. Accordingly, vibration of the drive unit 14 can be suppressed.

Further, the bolt holes 78 are formed in the outer surface of the housing 22, and in a state in which the threaded portions 72 of the bolts 70 are fitted into the bolt holes 78, the heads 74 of the bolts 70 press the upper ends 64 of the fastening members 60 against the side of the housing 22, whereby the fastening members 60 and the housing 22 are fastened to each other. The fastening surface 80 is defined by a plane including the upper ends 64 of the fastening members 60. In accordance with the above-described configuration, because the fastening members 60 are pressed downward by the bolts 70, the fastening members 60 and the housing 22 can be fastened together more firmly.

The drive unit according to the present invention is not limited to the above-described embodiment, and it goes without saying that various modified or additional configurations could be adopted therein without departing from the scope of the present invention.

What is claimed is:

1. A drive unit having a motor, and a circuit unit accommodating a drive circuit configured to supply to the motor electrical power input from a power source, the circuit unit being fixed to an upper side of a housing of the motor;

the circuit unit comprising:
    a plate-shaped heat sink that extends in a direction perpendicular to an axis of rotation of the motor; and
    a lower case arranged on a lower side of the heat sink;
    wherein a fastening member, which is formed on the lower case, is fastened to the housing;
    a height of a fastening surface, which is located on an upper end of the fastening member, is positioned within a height range that spans from a lower surface to an upper surface of the heat sink; and
    the heat sink comprises a coolant flow path formed between an upper surface of the heat sink and a lower surface of the heat sink.

2. The drive unit according to claim 1, wherein a height of a center of gravity of the circuit unit is positioned within the height range that spans from the lower surface to the upper surface of the heat sink.

3. The drive unit according to claim 1, wherein the fastening surface is positioned at a height of the lower surface of the heat sink.

4. The drive unit according to claim 1, wherein:
    a bolt hole is formed in an outer surface of the housing, and in a state in which a threaded portion of a bolt is fitted into the bolt hole, a head of the bolt presses the upper end of the fastening member against a side of the housing, whereby the fastening member and the housing are fastened to each other; and
    the fastening surface is a plane including the upper end of the fastening member.

5. A drive unit having a motor, and a circuit unit accommodating a drive circuit configured to supply to the motor electrical power input from a power source, the circuit unit being fixed to an upper side of a housing of the motor;

the circuit unit comprising:
    a plate-shaped heat sink on which components of the drive circuit are fixed on an upper surface and a lower surface thereof; and a lower case arranged on a lower side of the heat sink;

wherein a fastening member, which is formed on the lower case, is fastened to the housing;

a height of a fastening surface, which is located on an upper end of the fastening member, is positioned within a height range that spans from the lower surface to the upper surface of the heat sink; and the heat sink comprises a coolant flow path formed between an upper surface of the heat sink and a lower surface of the heat sink.

6. The drive unit according to claim 5, wherein:

a bolt hole is formed in an outer surface of the housing, and in a state in which a threaded portion of a bolt is fitted into the bolt hole, a head of the bolt presses the upper end of the fastening member against a side of the housing, whereby the fastening member and the housing are fastened to each other; and the fastening surface is a plane including the upper end of the fastening member.

* * * * *